United States Patent [19]

Giez et al.

[11] Patent Number: 5,366,999
[45] Date of Patent: Nov. 22, 1994

[54] FILLER-MODIFIED POLYURETHANE FOAM SUPPORTS FOR BIOCONVERSION PROCESSES

[75] Inventors: Edmund Giez, Leichlingen; Imre Pascik, Monheim; Joachim Priemer, Odenthal, all of Germany

[73] Assignee: Bayer Aktiengesellschaft, Leverkusen, Germany

[21] Appl. No.: 90,225

[22] Filed: Jul. 9, 1993

Related U.S. Application Data

[63] Continuation-in-part of Ser. No. 15,720, Feb. 9, 1993, Pat. No. 5,252,616.

[30] Foreign Application Priority Data

Nov. 12, 1992 [DE] Germany .............................. 4238126

[51] Int. Cl.$^5$ .............................................. C08J 9/224
[52] U.S. Cl. ......................................... 521/54; 521/53; 521/57; 521/137
[58] Field of Search ...................... 521/54, 137, 53, 57

[56] References Cited
U.S. PATENT DOCUMENTS 4,231,901  11/1980  Berbeco .................. 521/55

*Primary Examiner*—Morton Foelak
*Attorney, Agent, or Firm*—Sprung Horn Kramer & Woods

[57] ABSTRACT

A polyurethane foam web with a thickness of 5 mm to 30 mm is passed continuously through a dipping bath and is thereby impregnated with 10% to 1000% by weight of a polymer dispersion consisting of the components A) and B) defined below:

A) 30% to 65% by weight, preferably 40% to 60% by weight and particularly preferably 45% to 50% by weight of a cationic styrene/butadiene copolymer latex containing about 50% of dry substance, or of an anionic butadiene/acrylonitrile copolymer latex, and B) 10% to 50% by weight, preferably 15% to 40% by weight and particularly preferably 25% to 35% by weight of an inorganic and/or organic pulverulent filler, and the foam web treated in this way is compressed to remove excess liquid and then dried in a drying oven at temperatures of 80° C. to 120° C.

6 Claims, No Drawings

FILLER-MODIFIED POLYURETHANE FOAM SUPPORTS FOR BIOCONVERSION PROCESSES

This is a continuation-in-part of application Ser. No. 08/015,720, filed Feb. 9, 1993, now U.S. Pat. No. 5,252,616.

This invention relates to a non-polluting process for the manufacture of filler-modified polyurethane foam supports for microorganisms and enzymes, with an increased degree of homogeneity.

Porous supports based on PUR foam, in the form of granules or cubes and impregnated with inorganic and/or organic fillers, have proved successful in bioconversion processes, e.g. in the biological treatment of effluent and exhaust gas, as an important auxiliary substance and promoter for substantially increasing the process stability and the space-time yield. Such supports with modified surfaces are superior to unmodified foam-based supports.

According to DE 3526184, such supports are manufactured in a twin-paddle screw trough with counter-rotating paddle shafts. Here the comminuted polyurethane foam particles, in the form of cubes, rods or flakes, and the intended fillers are fed into the screw trough via separate metering screws. The binder, an aqueous polymer latex and/or a reactive prepolymer containing isocyanate end groups, is introduced at the same point and the reactor contents are intimately mixed, resulting in a good distribution of the fillers and wetting and coating of the foam particles. After a coagulant has been sprayed in and/or after thermal coagulation at 40°–90° C. for 3 to 10 minutes, the completely reacted mixture is washed to remove unbound fines or dissolved salts.

Both this process and the products thereby obtained have some disadvantages. The nature and intensity of the mixing operation do not permit optimum mixing of all the components, so the foam matrix is not impregnated uniformly; this produces supports with different densities which are disadvantageous for their use. An inhomogeneous distribution of the binder results in points where the filler pigments are incompletely bound, which, in the case of their use in fluidized bed reactors, leads to increased abrasion losses and changes in the density of the supports. Per part by weight of product, the process requires about three times the amount of wash water, which becomes contaminated with solid particles, dissolved salts and dissolved organic substances and has to be disposed of as effluent.

These disadvantages could be overcome by the process according to the invention described in greater detail below and by the product according to the invention which can be manufactured by said process.

The invention provides a process for the manufacture of polymer-bound supports containing fillers, wherein a polyurethane foam web with a thickness of 5 mm to 30 mm, preferably 7 mm to 15 mm, is passed continuously through a dipping bath and is thereby impregnated with 10% to 1000% by weight of a polymer dispersion having the following composition:

A) 30% to 65% by weight, preferably 40% to 60% by weight and particularly preferably 45% to 50% by weight of a cationic styrene/butadiene copolymer latex containing about 50% of dry substance, or of an anionic butadiene/acrylonitrile copolymer latex, and B) 10% to 50% by weight, preferably 15% to 40% by weight and particularly preferably 25% to 35% by weight of an inorganic and/or organic pulverulent filler, and the foam web treated in this way is compressed to remove excess liquid and then dried in a drying oven at temperatures of 80° C. to 120° C. Advantageously, 15% to 35% by weight, preferably 18% to 30% by weight and particularly preferably 22% to 28% by weight of a cationic or anionic polyurethane dispersion containing 15% of dry substance are added to the polymer dispersion.

1% to 5% by weight of an amphoteric emulsifier can also be added to the polymer dispersion to improve emulsification.

The dried filled foam web, which contains the fillers homogeneously distributed in bound form with the aid of the polymer latex, is then cut into shaped articles of the desired dimensions in a cutting installation with adjustable revolving band knives.

The fillers perform two essential tasks in the supports according to the invention. On the one hand, they serve as a surface-active constituent of the support, promoting the colonization of the microorganisms. On the other hand, the density of the support can be adjusted at will by varying the proportion by weight in the total mass. Examples of suitable inorganic pulverulent fillers are iron oxide pigments, bentonite, kaolin, powdered glass, calcium carbonate, quartz sand, activated charcoal, carbonized lignite, anthracite, coal dust, pulverized ion exchangers or adsorbent resins, etc.

The PUR foams serve as a porous, three-dimensional, elastic support skeleton which is not degradable in water and which only acquires the desired optimum properties for technical application after it has been modified and impregnated. It is preferable to use polyether-based flexible PUR foams with a density of about 10 to 100 kg/m$^3$.

The polymer dispersions are dispersions of polymers of olefinic monomers which form elastic films, it being possible to improve the dispersibility of the polymers in water with non-ionic as well as anionic and cationic emulsifiers, which in turn can be present either in the form of external emulsifiers not chemically incorporated in the polymer skeleton, or in the form of internal emulsifiers chemically incorporated in the polymer skeleton. Of particular interest, for example, are the styrene/butadiene latices prepared by emulsion polymerization, it optionally being possible for these dispersions to be modified with internal alkyl acrylates or methacrylates.

Cationically modified latices are particularly preferred because they give the supports better properties for technical application.

A combination of a cationically modified latex with aqueous cationic polyurethane dispersions is found to be very advantageous; in addition to the emulsifying properties, the latter also provide the support with am increased hydrophilicity, are decisive for the rapid growth of microorganisms or, in bioprocesses, for material transport, and permit an increased filler loading and quicker wetting with water.

The impregnating mass is prepared by a procedure in which the latex and dilute emulsifier are introduced, with stirring, optionally with the addition of a suitable antifoaming, agent separately prepared suspension of the filler and a dilute PUR dispersion is incorporated into this mixture and the whole is homogenized.

According to the invention the foam supports produced by the above process are characterized in that the foam pores freely accessible from the surface are coated with a coherent, elastic and firmly adhering copolymer film which is obtained by crosslinking a cationic styrene/butadiene copolymer latex or an anionic butadiene/acrylonitrile copolymer latex and in which inorganic and/or organic filler particles are embedded.

In these supports the polyurethane foam content is 20 to 80% by weight, preferably 40 to 60% by weight, the copolymer content is 8 to 40% by weight, preferably 15 to 25% by weight, and the filler content is 10 to 60% by weight, preferably 25 to 40% by weight. The aforementioned contents relate to the total weight of the finished, dry, filler-modified polyurethane foam support.

Iron oxide pigments, such as $Fe_2O_3$ and $Fe_3O_4$, are preferably used as fillers.

The following Examples serve to illustrate the invention.

EXAMPLE 1

Preparation of a support according to the state of the art 49.8 parts by weight of an anionic latex containing 41% of dry substance (Perbunan N latex 2890, manufactured by Bayer AG), 1.2 parts by weight of an aqueous emulsifier containing 30% of dry substance (ammonium salt of a sulphated polyether), 2.0 parts by weight of a 10% sodium tripolyphosphate solution and 0.8 part by weight of an antifoam were placed in a tank and homogenized with a separately prepared filler suspension, with stirring. The filler suspension contained 25.6 parts by weight of an iron oxide pigment based on $Fe_3O_4$ (Bayferrox 318, Bayer AG), 16.6 parts by weight of a 5% solution of a dispersant based on a naphthalenesulphonic acid condensation product and 4.0 parts by weight of a 33% thickener based on polyacrylate. This impregnating mass was incorporated with the aid of a pad into a 7 mm thick PUR foam weld with a density D of 25 $kg/m^3$ up to a weight increase (in the dried state) of 180%, based on the weight of the untreated foam. The impregnated web was cut into portions with dimensions of $15 \times 15 \times 7$ mm. The supports had a density of 45 g/l.

After a bulk volume of 500 ml of these supports had been introduced into an experimental sewage treatment plant filled with 5 l of domestic sewage and aerated by means of porous gas distribution units, said supports only exhibited inadequate wetting, even after aeration for 48 hours, and were not fluidizable.

EXAMPLE 2

Preparation of the support according to the invention 46.34 parts by weight of a cationic styrene/butadiene latex containing 50% of dry substance and 1.39 parts by weight of a 33% emulsifier based on ethoxylated tallow fatty amine (Geramin T 100, Hoechst AG) were placed in a stirred tank with the addition of minimum amounts of an antifoam. A suspension of 29 parts by weight of an iron oxide pigment based on $Fe_3O_4$ (Bayerferrox 318, Bayer AG), 23 parts by weight of a 15% aqueous cationic PUR dispersion and minimum amounts of an antifoaming agent was added to this mixture and the whole was homogenized. This impregnating mass was incorporated into a foam web as described in Example 1, the impregnated web was cut into portions with dimensions of $15 \times 15 \times 7$ mm and these were tested for their fluidizability in domestic sewage. All the supports were fluidizable after 8 hours.

In the impregnation of the polyurethane foam web, the filler-containing polymer dispersion penetrates into all of the freely accessible foam pores and uniformly coats their internal surfaces. During subsequent drying the latex is crosslinked and forms a coherent, elastic, firmly adhering polymer film on the surface of the pores. The pigment particles, preferably $Fe_2O_3$ or $Fe_3O_4$, are firmly embedded in this film. The polymer layer serves as a binder and ensures that the pigment particles are firmly fixed. The pores are only partially filed with the pigment particles. Whereas the density of the non-filled foam web is about 25 $kg/m^3$ prior to impregnation, the density of the finished filler-modified polyurethane foam support is 35 $g/m^3$–180 $kg/m^3$.

It will be understood that the specification and examples are illustrative but not limitative of the present invention and that other embodiments within the spirit and scope of the invention will suggest themselves to those skilled in the art.

We claim:

1. A filler-modified polyurethane foam support for a bioconversion process, having foam pores which are freely accessible from the surface, are coated with a coherent, elastic, firmly adhering copolymer film which is obtained by crosslinking a cationic styrene/butadiene copolymer latex or an anionic butadiene/acrylonitrile copolymer latex and in which inorganic and/or organic filler particles are embedded, wherein
   a) the polyurethane foam content is about 20 to 80% by weight,
   b) the copolymer content is about 8 to 40% by weight, and
   c) the filler content is about 10 to 60% by weight, based on the weight of the filler-modified polyurethane foam support.

2. A foam support according to claim 1, wherein the filler comprises iron oxide pigments.

3. A foam support according to claim 1, having a density in the range from about 25 $kg/m^3$ to 180 $kg/m^3$.

4. A foam support according to claim 1, wherein
   a) the polyurethane foam content is about 40 to 60% by weight,
   b) the copolymer content is about 15 to 25% by weight, and
   c) the filler content is about 25 to 40% by weight.

5. A foam support according to claim 4, wherein the filler comprises iron oxide pigments and having a density in the range from about 25 $kg/m^3$ to 180 $kg/m^3$.

6. A foam support according to claim 1, wherein the filler consists essentially of at least one member selected from the group consisting of an iron oxide pigment, bentonite, kaolin, powdered glass, calcium carbonate, quartz sand, activated charcoal, carbonized lignite, anthracite, coal dust, a pulverized ion exchanger and a pulverized adsorbent resin.

* * * * *